US012547195B2

(12) United States Patent
Kumar

(10) Patent No.: US 12,547,195 B2
(45) Date of Patent: Feb. 10, 2026

(54) POLE FREQUENCY TRACKING IN LOAD COMPENSATED AMPLIFIERS

(71) Applicant: Silicon Laboratories Inc., Austin, TX (US)

(72) Inventor: Sagar Kumar, Oslo (NO)

(73) Assignee: Silicon Laboratories Inc., Austin, TX (US)

( * ) Notice: Subject to any disclaimer, the term of this patent is extended or adjusted under 35 U.S.C. 154(b) by 377 days.

(21) Appl. No.: 18/177,842

(22) Filed: Mar. 3, 2023

(65) Prior Publication Data

US 2024/0295891 A1 Sep. 5, 2024

(51) Int. Cl.
*G05F 1/575* (2006.01)

(52) U.S. Cl.
CPC .................................... *G05F 1/575* (2013.01)

(58) Field of Classification Search
CPC .......... G05F 1/575; G05F 1/577; G05F 1/585; G05F 1/59; G05F 1/595; G05F 1/61; G05F 1/461; G05F 1/56; G05F 1/563; G05F 1/565; G05F 1/569; G05F 1/571; G05F 1/573; G05F 1/5735
See application file for complete search history.

(56) References Cited

U.S. PATENT DOCUMENTS

| | | | | |
|---|---|---|---|---|
| 6,140,876 | A | 10/2000 | Yero | |
| 6,486,740 | B1 | 11/2002 | Baldwin et al. | |
| 10,175,707 | B1 | 1/2019 | Wei et al. | |
| 11,025,213 | B2 | 6/2021 | Roy | |
| 2010/0045380 | A1 | 2/2010 | Ivanov et al. | |
| 2014/0176098 | A1* | 6/2014 | Fang ......................... | G05F 1/46 323/280 |
| 2014/0368176 | A1 | 12/2014 | Mandal | |
| 2017/0047836 | A1* | 2/2017 | Endo ......................... | G05F 1/56 |
| 2021/0320635 | A1 | 10/2021 | Altan et al. | |

* cited by examiner

*Primary Examiner* — Nguyen Tran
(74) *Attorney, Agent, or Firm* — Zagorin Cave LLP

(57) ABSTRACT

A voltage regulator includes a first circuit to generate a difference signal based on an input reference voltage, a regulated output voltage, and a signal on a feedback node. The voltage regulator includes a second circuit to provide the regulated output voltage on the output node based on the difference signal. The second circuit includes a first transistor coupled to receive the difference signal, a first feedback circuit to provide a first feedback signal to the feedback node, and a second feedback circuit to provide a second feedback signal to the feedback node. An open loop frequency response of the voltage regulator has a first pole and a second pole and the first feedback signal may adjust the frequency of the second pole based on a load current. The second feedback signal may adjust loop gain based on the load current.

19 Claims, 6 Drawing Sheets

POLE FREQUENCY TRACKING IN LOAD COMPENSATED AMPLIFIERS

BACKGROUND

Field of the Invention

This application relates to integrated circuits and more particularly to generating a reference signal in integrated circuits.

Description of the Related Art

In general, a voltage regulator is a circuit designed to maintain a constant output voltage. A linear regulator typically regulates its output voltage by controlling a difference between the output voltage and an input voltage. Referring to FIG. 1, voltage regulator 100 is a low power, low dropout (LDO) regulator for high load current applications. In general, voltage regulator 100 compares regulated voltage VREG to reference voltage VREF and adjusts regulated voltage VREG accordingly. This operation occurs with stable operation, i.e., with a predetermined phase margin and maintains sufficient spacing between a dominant pole and a second pole to avoid oscillation. A feedback circuit is included to maintain stable operation over varying load conditions and across a wide range of load currents, e.g., a range spanning over three orders of magnitude of current.

P-channel metal oxide semiconductor field effect transistor (i.e., PMOS transistor) 128 is coupled between power supply node VDD and output node 130, which couples to a load circuit (i.e., a load) and provides a regulated voltage VREG to the load. This load circuit is represented as a combined resistance and capacitance (RL and CL, respectively). The load circuit dominant pole $\omega_{p1}$ for voltage regulator 100:

$$\omega_{p1} = \frac{1}{R_L C_L}.$$

By controlling the output current of transistor 128, regulated voltage VREG is regulated to a target level. PMOS transistor 128 has a source terminal coupled to power supply node VDD, a drain terminal coupled to output node 130, and a gate terminal commonly coupled with one or more gate terminals of at least one other PMOS transistor. The gate terminal of PMOS transistor 128 acts as a control terminal to control the current provided to the load by PMOS transistor 128.

The control signal provided to the gate terminal of PMOS transistor 128 is generated using two amplifier circuits. Amplifier circuit 150 is a transconductance amplifier including n-channel metal oxide semiconductor field effect transistor (i.e., NMOS transistor) 102 and NMOS transistor 104, which are coupled as a differential pair of transistors. Amplifier circuit 150 compares regulated voltage VREG and reference voltage VREF, which in an embodiment is generated by a reference voltage generator (not shown). The source terminals of NMOS transistor 102 and NMOS transistor 104 are coupled to a drain terminal of NMOS transistor 106, which is configured as a current source that uses bias voltage VBIAS to provide a bias current to the differential pair of transistors. PMOS transistors 112, 114, 116, and 118 form a cascoded current mirror where PMOS transistor 118 mirrors PMOS transistor 116 and PMOS transistors 112 and 114 are cascode devices. PMOS transistor 112 and PMOS transistor 114 have the same size, which is selected to maintain PMOS transistors 116 and 118 in a saturation region of operation. The cascode structure converts the input voltages to currents and applies the result to a common gate stage. PMOS transistors 112, 114, 116, and 118 coupled to NMOS transistors 102 and 104 form a folded cascode stage modified to receive a feedback voltage on feedback node 136.

Drain terminals of NMOS transistor 102 and NMOS transistor 104 provide a differential signal to source terminals of PMOS transistor 112 and PMOS transistor 114, thereby causing a voltage on node 134 that corresponds to the difference between regulated voltage VREG and reference voltage VREF. PMOS transistors 116 and PMOS transistor 118 have commonly coupled gate terminals. PMOS transistor 116 and PMOS transistor 118 are asymmetrically coupled (e.g., do not have commonly coupled source terminals) which improves stability. The source terminal of PMOS transistor 118 is coupled to power supply node VDD and a drain terminal of PMOS transistor 118 is coupled to the drain terminal of NMOS transistor 102. However, the source terminal of PMOS transistor 116 is coupled to receive a feedback voltage on feedback node 136. Feedback node 136 couples to the source terminal of PMOS transistor 116 to provide a feedback voltage to dynamically control operation of error amplifier circuit 150, as well as dynamically controlling a location of the second pole based on the load current. Parasitic capacitance C1, which is coupled in parallel between the supply voltage node and the drain terminal of PMOS transistor 114, provides a second pole of regulator 100:

$$\omega_{p2} = \frac{g_{dsn} + g_{mpx} R_{fb} g_{mp}}{R_L C_1}.$$

The output of the amplifier circuit 150 controls the gate of PMOS transistor 120, which is the input to amplifier circuit 152. NMOS transistor 122 forms a current mirror with NMOS transistor 124 with which it has a commonly coupled gate terminals. Resistor R1 and PMOS transistor 126 provide a minimum current to configure NMOS transistor 124, NMOS transistor 122, and PMOS transistor 120 in an operational state when the load current is zero.

PMOS transistor 128 and series-coupled PMOS transistors 132 have commonly coupled gate terminals, thereby forming another current mirror. PMOS transistors 132 are coupled in series between power supply node VDD and the drain terminal of NMOS transistor 124 and have commonly coupled gate terminals. PMOS transistors 132 and 128 may have the same channel length. PMOS transistors 132 and PMOS transistor 128 may have the same effective width. In an embodiment, four PMOS transistors are coupled in series to reduce the effective width to W/4 to obtain a target multiplication factor from PMOS transistors 132 to PMOS transistor 128. The combination of PMOS transistors 132 and PMOS transistor 128 provides a ratio of ¼:50 (i.e., an effective ratio of 1:200).

The frequency of the second pole of voltage regulator 100 varies with the load current, which may vary during operation of voltage regulator 100. As the dominant pole determined by the load circuit (RL and CL) moves to a higher frequency when load current increases, the second pole moves in frequency in concert with the dominant pole, thereby providing stability and dynamic load regulation response. Feedback resistor RFB causes the second pole to become a function of the transconductance of PMOS transistor 120. When the load current increases, the transconductance of PMOS transistor 120 also increases, causing the second pole to move to a higher frequency. Accordingly, sufficient spacing is maintained between the dominant pole and the second pole to realize a target level of phase margin and target dynamic load regulation performance. The dynamic movement of the second pole occurs without increasing internal bias currents, such as the current provided by NMOS transistor 106, resulting in low power operation of regulator 100 when the load current is low (e.g., in the nanoampere to microampere range).

As reference voltage VREF exceeds the output voltage, the voltage at node 134 decreases. This voltage decrease causes the current flowing through PMOS transistor 120 to increase, thereby increasing the current flowing through PMOS devices 132 and 128. This increased current flowing through PMOS transistor 128 causes an increase in regulated voltage VREG, thus regulating the output voltage to the reference voltage.

The DC loop gain of voltage regulator 100 is:

$$DC\text{ loop gain} = \frac{g_{mn}}{(g_{mpx}R_{fb}g_{mp})} \times N \times g_{mpx} \times R_L = \frac{g_{mn} \times N \times R_L}{R_{fb}g_{mp}},$$

where N is the ratio of the width of NMOS transistor 124 ($W_{124}$) to the width of NMOS transistor 122 ($W_{122}$) times the ratio of the width of PMOS transistor 128 ($W_{128}$) to the width of PMOS transistors 132 ($W_{132}$) (e.g., $N=(W_{124}/W_{122})\times(W_{128}/W_{132})=2\times200=400$). As the load current (VREG/RL) increases, the load resistance decreases, which substantially reduces the DC loop gain for high currents. The reduction in DC loop gain for high load currents corresponds to high systematic offset at the output and thus degrades the ability to maintain a constant voltage level on the output node as the load current increases (i.e., degrades load regulation). Accordingly, improved techniques for load regulation are desired.

SUMMARY OF EMBODIMENTS OF THE INVENTION

A voltage regulator includes a first circuit configured to generate a difference signal based on a reference voltage on an input node, a regulated output voltage on an output node, and a signal on a feedback node. The voltage regulator includes a second circuit configured to provide the regulated output voltage on the output node based on the difference signal. The second circuit includes a first transistor coupled to receive the difference signal, a first feedback circuit configured to provide a first feedback signal to the feedback node, and a second feedback circuit and configured to provide a second feedback signal to the feedback node. An open loop frequency response of the voltage regulator may have a first pole at a first frequency and a second pole at a second frequency and the first feedback signal adjusts the second frequency of the second pole based on a load current. The second feedback signal may adjust loop gain based on the load current.

A method for generating a stable output voltage includes generating a regulated voltage based on a difference between a reference voltage on an input node and the regulated voltage according to an open loop frequency response having a first pole at a first frequency and a second pole at a second frequency. A location of the second pole of the open loop frequency response and a DC loop gain are based on a load current. The DC loop gain of the generating may saturate at high load current. Generating the regulated voltage may include saturating a feedback transconductance with increases to the load current. The first frequency may be several orders of magnitude less than the second frequency.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 2:
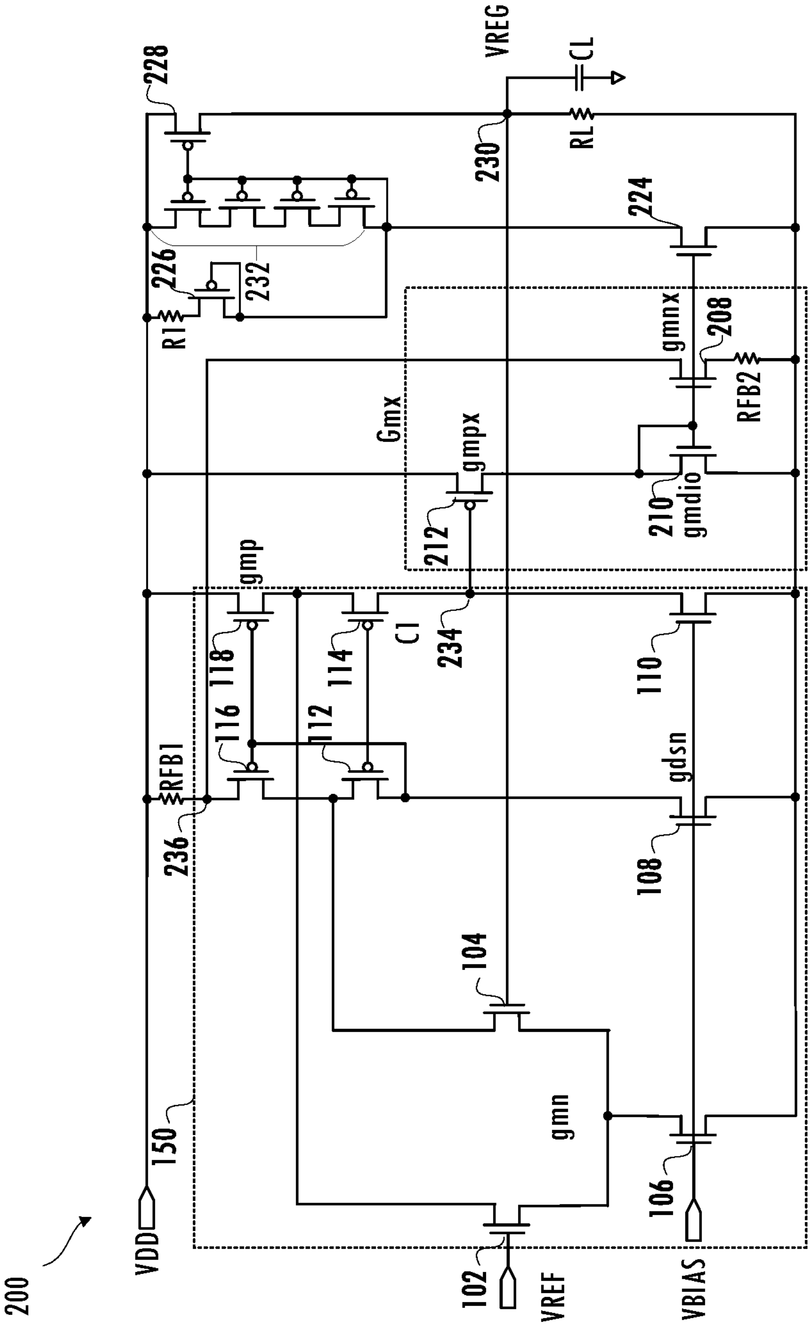
FIG. 2 illustrates a circuit diagram of a load compensating voltage regulator consistent with at least one embodiment of the invention.

Referring to FIG. 2, load compensating voltage regulator 200 has stable operation and provides predetermined load regulation across a wide range of load currents. Load compensating voltage regulator 200 compares regulated voltage VREG to reference voltage VREF and adjusts regulated voltage VREG accordingly. This voltage regulation occurs with stable operation, i.e., with a predetermined phase margin and sufficient spacing between a dominant pole and a second pole for load currents that vary over three orders of magnitude.

PMOS transistor 228, which is coupled between power supply node VDD and output node 230 that couples to a load, provides regulated voltage VREG to the load. This load circuit is represented as a combined resistance and capacitance (RL and CL, respectively). By controlling the output current of PMOS transistor 228, regulated voltage VREG is regulated to a target level. In an embodiment, PMOS transistor 228 has a source terminal coupled to power supply node VDD, a drain terminal coupled to output node 230, and a gate terminal commonly coupled with one or more gate terminals of at least one other PMOS transistor. The gate terminal of PMOS transistor 228 acts as a control terminal to control the current provided to the load by PMOS transistor 228.

In at least one embodiment of voltage regulator 200, the control signal provided to the gate terminal of PMOS transistor 228 is generated using two amplifier circuits. Amplifier circuit 150 is a transconductance amplifier including NMOS transistor 102 and NMOS transistor 104, which are coupled as a differential pair of transistors. Amplifier circuit 150 compares regulated voltage VREG to reference voltage VREF, which in an embodiment is generated by a reference voltage generator (not shown). The source terminals of NMOS transistor 102 and NMOS transistor 104 are coupled to a drain terminal of NMOS transistor 106, which is configured as a current source that uses bias voltage VBIAS to provide a bias current to the differential pair of transistors.

Drain terminals of NMOS transistor 102 and NMOS transistor 104 provide a differential pair of signals to source terminals of PMOS transistor 112 and PMOS transistor 114, thereby causing a voltage on node 234 that corresponds to the difference between regulated voltage VREG to reference voltage VREF and is adjusted using a feedback signal on feedback node 236. NMOS transistor 102 and NMOS transistor 104 have sizes determined to maintain a small random offset of voltage regulator 200. NMOS transistors 106, 108, and 110 have sizes that determine the bias currents in amplifier circuit 150 according to a bias voltage VBIAS, which is generated by a bias voltage generator (not shown).

PMOS transistors 116 and PMOS transistor 118 have commonly coupled gate terminals and typically have the same size. The source terminal of PMOS transistor 118 is coupled to power supply node VDD and a drain terminal of PMOS transistor 118 is coupled to the drain terminal of NMOS transistor 102. However, PMOS transistor 116 is coupled between a drain terminal of PMOS transistor 104 and feedback node 236 to receive a feedback signal generated using feedback resistor RFB1 and feedback transconductance Gmx. PMOS transistor 116 and PMOS transistor 118 are asymmetrically coupled (e.g., do not have commonly coupled source terminals) which improves stability. A second feedback path including NMOS transistor 208 and feedback resistor RFB2 is coupled to feedback node 236.

The input to the second amplifier circuit is received by the gate terminal of PMOS transistor 212, which has a source terminal coupled to power supply node VDD. PMOS transistor 212 has a size selected to control the stability and the DC loop gain of voltage regulator 200. The drain terminal of PMOS transistor 212 is coupled to a current mirror formed by NMOS transistor 210 and NMOS transistor 224. In an embodiment of the current mirror, NMOS transistor 210 and NMOS transistor 224 have the same size, which is selected to maintain these transistors in the saturation region of operation.

PMOS transistors 232 use the mirrored current to generate a control voltage provided to PMOS transistor 228 to control the load current provided to output node 230. In an embodiment of voltage regulator 200, resistor R1 and PMOS transistor 226 provide a minimum current to configure NMOS transistor 224, NMOS transistor 208, NMOS transistor 210 and PMOS transistor 212 operational when the load current is zero (e.g., a substantially high load resistance RL), instead of being off when the load current is zero. PMOS transistor 226 and PMOS transistors 232. PMOS transistor 228 is several times larger than PMOS transistors 232 thereby providing output current multiplication for the generating the load current. In an embodiment, four PMOS transistors are coupled in series to reduce the effective width to W/4 to obtain a target multiplication factor from PMOS transistors 232 to PMOS transistor 228. In an embodiment, only one PMOS transistor is used instead of PMOS transistors 232 and PMOS transistor 228 is four times larger. The combination of PMOS transistors 232 and PMOS transistor 228 provides a ratio of ¼:50 (i.e., an effective ratio of 1:200). Reducing the size of PMOS transistor 228 reduces its current driving capability which limits further reduction in the size of PMOS transistor 228 for some applications.

In addition to a feedback path provided by coupling RFB1 to feedback node 236, an additional feedback path couples feedback transconductance Gmx to feedback node 236. In an embodiment, feedback transconductance Gmx, which is coupled to ground, includes NMOS transistor 208 and feedback resistor RFB2 and controls the voltage on feedback node 236. The voltage on feedback node 236 dynamically controls operation of error amplifier circuit 150 based on the load current. Feedback resistor RFB1 and feedback resistor RFB2 dynamically adjusts a location of the second pole of voltage regulator 200 based on the load current.

Figure 3:
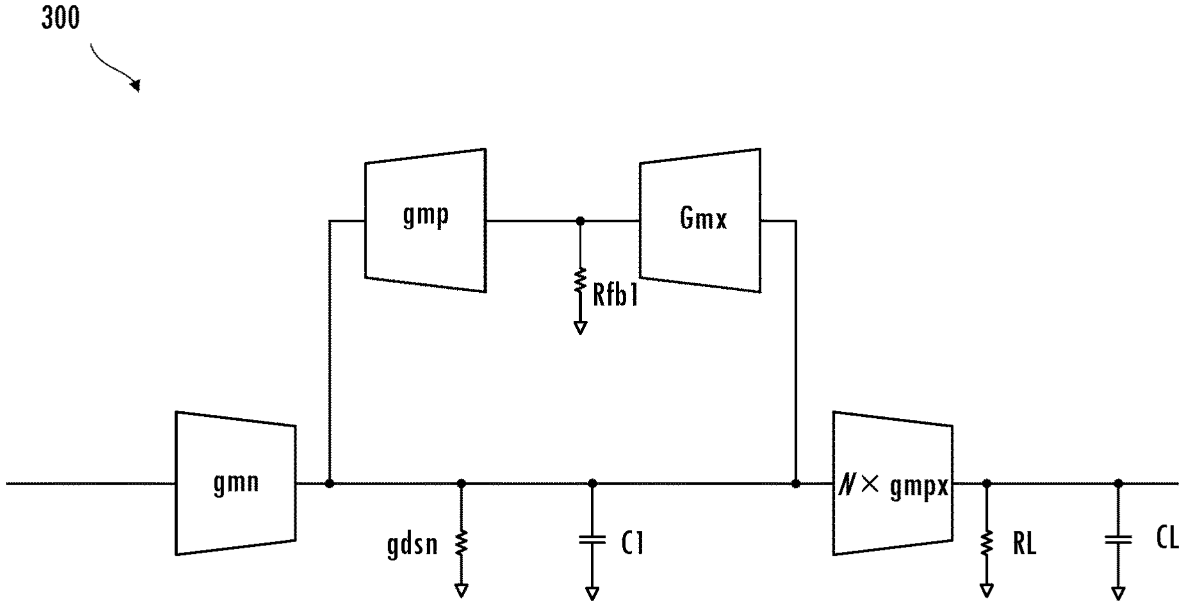
FIG. 3 illustrates a small signal model of the load compensating voltage regulator of FIG. 2.
Figure 4:
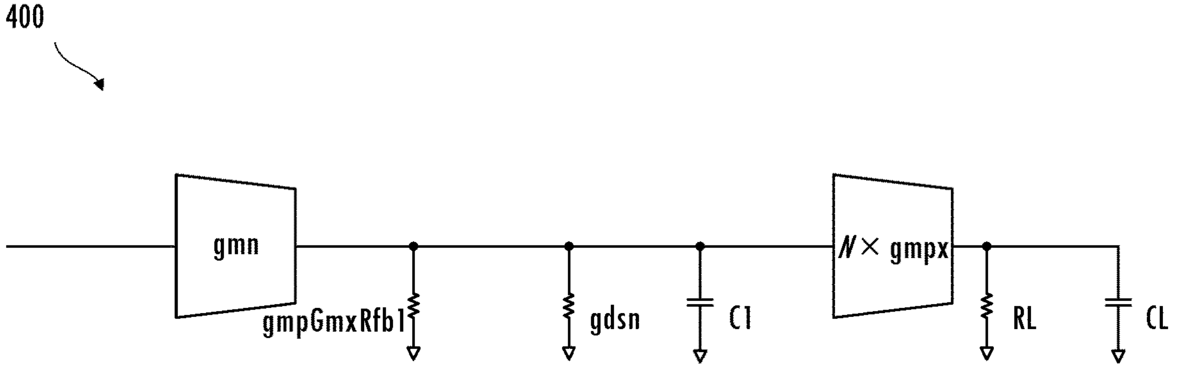
FIG. 4 illustrates an equivalent small signal model of the load compensating voltage regulator of FIG. 2.
Figure 5:
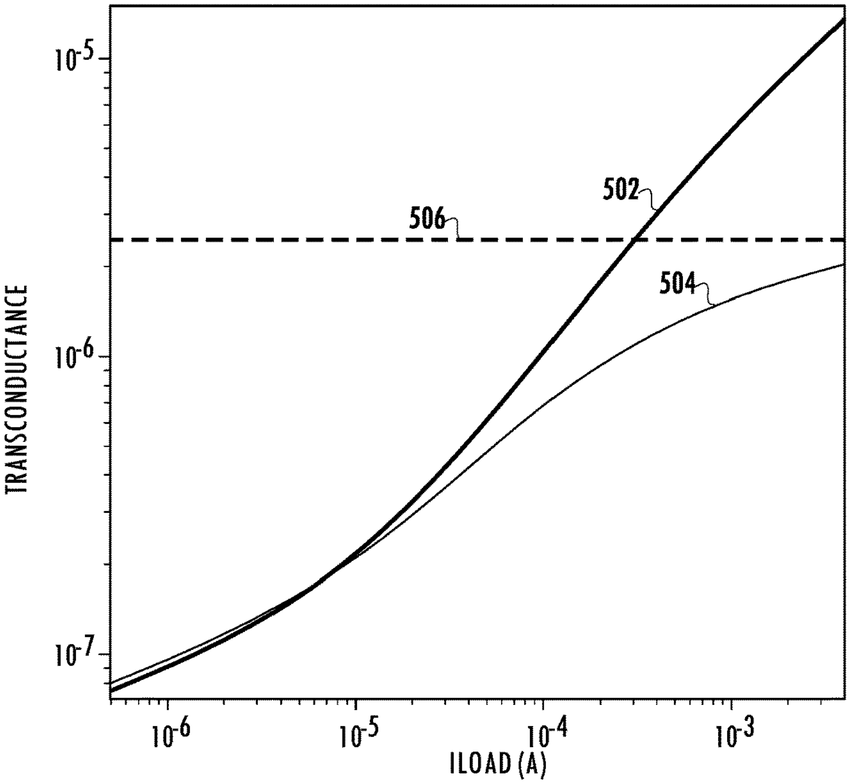
FIG. 5 illustrates transconductance Gmx as a function of load current for the voltage regulator circuits of FIGS. 1 and 2.

Referring to FIGS. 2, 3, and 4, small signal diagram 300 and simplified small signal model 400 are used to derive the following equations for first pole $\omega_{p1}$, second pole $\omega_{p2}$, and DC loop gain for voltage regulator 200. Similar to voltage regulator 100 described above, the load circuit of voltage regulator 200 provides dominant pole $\omega_{p1}$ for voltage regulator 200:

$$\omega_{p1} = \frac{1}{R_L C_L}.$$

In an exemplary embodiment of voltage regulator 200, the feedback transconductance is:

$$G_{mx} = \frac{g_{mpx}}{g_{mdio}} \cdot \frac{g_{mnx}}{1 + RFB2 g_{mnx}}$$

Feedback transconductance Gmx increases with increasing load current, but saturates at higher load currents. As a result, the DC loop gain and the second pole are dynamically adjusted based on the load current:

$$DC \text{ Gain} = \frac{g_{mn}}{g_{dsn} + g_{mp} G_{mx} RFB1} \times \frac{N g_{mpx}}{R_L};$$

and $$\omega_{p2} = \frac{g_{dsn} + g_{mp} G_{mx} RFB1}{C_1},$$

where N is a predetermined design parameter (e.g., 400) that provides independent control over the DC loop gain and current multiplication for the load current is predetermined according to the target application. For example, N is the ratio of the width of NMOS transistor 224 ($W_{224}$) to the width of NMOS transistor 210 ($W_{210}$) times the ratio of the width of PMOS transistor 228 ($W_{228}$) to the width of PMOS transistors 232 ($W_{232}$) (e.g., N=($W_{224}$/$W_{210}$)×($W_{228}$/$W_{232}$) =2×200=400). In other embodiments of voltage regulator 200, other ratios are used.

When the load current increases, feedback transconductance Gmx 504 increases but saturates at higher load currents.

That is, as the load current increases, Gmx does not match the increase in high load current with a linear relationship and asymptotically approaches transconductance 506, which is 1/RFB2. However, transconductance Gmx 502 for voltage regulator 100 described above (which does not include RFB2) does not saturate and continues to increase linearly with increased load current. As reference voltage VREF increasingly exceeds output voltage VREG, the voltage at node 234 decreases, which causes the current flowing through PMOS transistor 212 to increase, thereby increasing the current flowing through PMOS devices 232 and 228. This increase causes an increase in regulated voltage VREG, thus regulating the output voltage to the reference voltage. Note that RFB2 can be coupled in other locations of a loop formed by PMOS transistor gmpx, NMOS transistor gmdio, RFB2, and NMOS transistor gmnx of voltage regulator 200, voltage regulator 900, or voltage regulator 1000.

Figure 1:
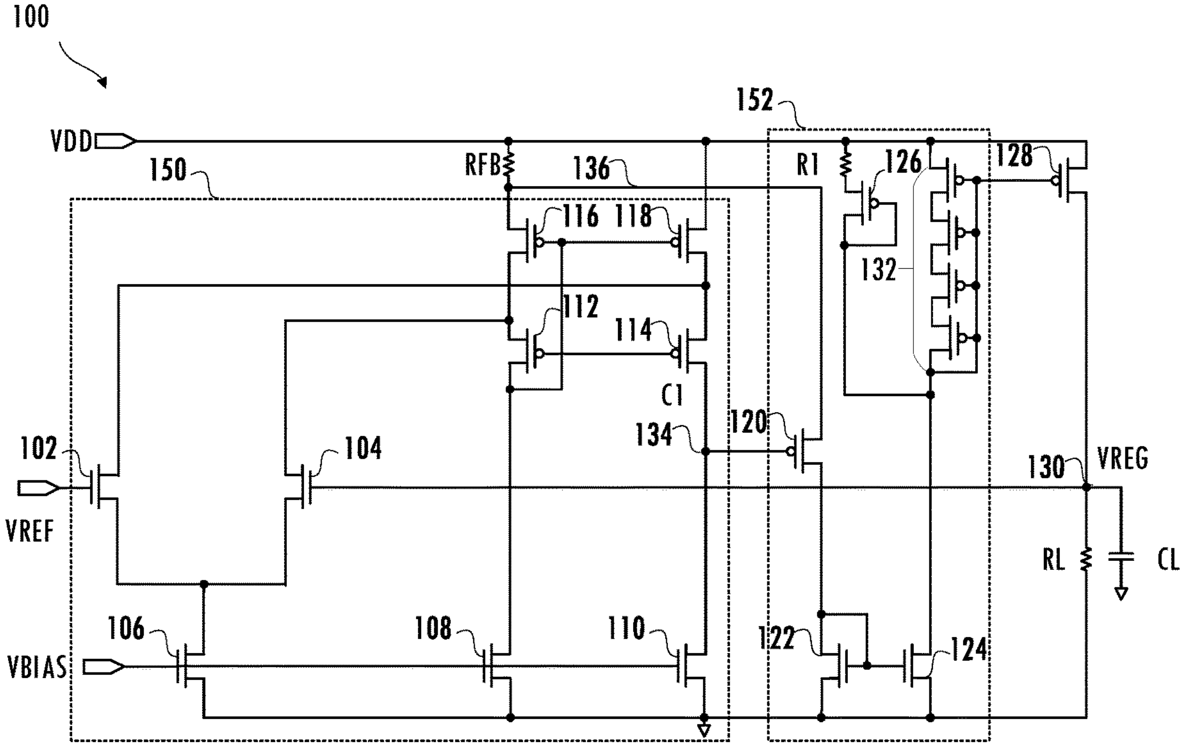
(PRIOR ART) FIG. 1
FIG. 1 illustrates a circuit diagram of a voltage regulator having a feedback circuit.
Figure 6:
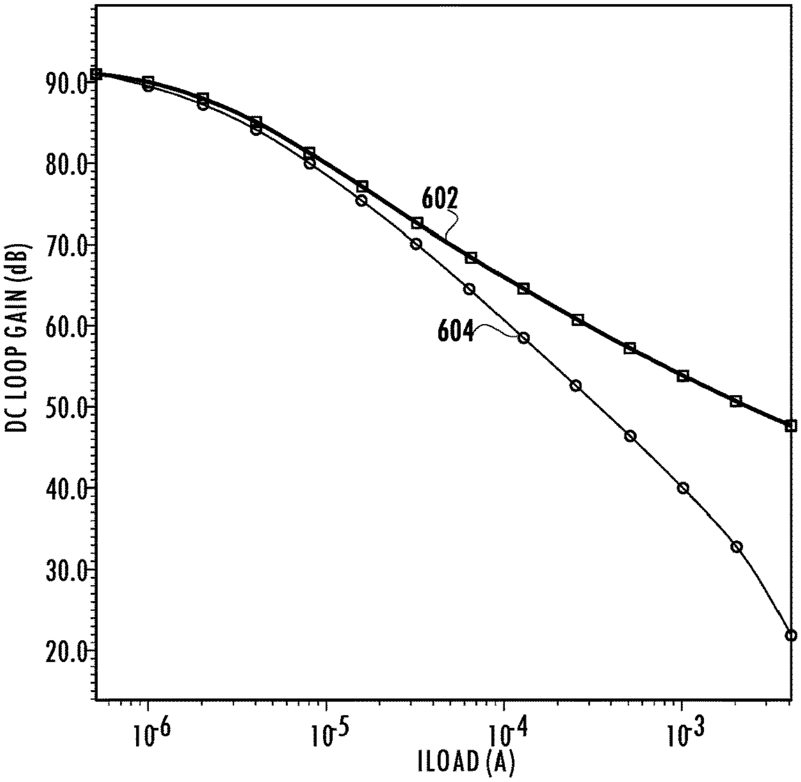
FIG. 6 illustrates DC loop gain as a function of load current for the voltage regulator circuits of FIGS. 1 and 2.

Referring to FIGS. 1, 2, and 6, in at least one embodiment, RFB2 is at least one order of magnitude greater than RFB1. DC loop gain 604 of voltage regulator 100 decreases from approximately 90 dB to approximately 21 dB with increases to load current of over three orders of magnitude. In comparison, DC loop gain 602 of voltage regulator 200 decreases from approximately 90 dB to approximately 48 dB over the same range of load current, which is an acceptable amount of DC loop gain for a target application.

Figure 7:
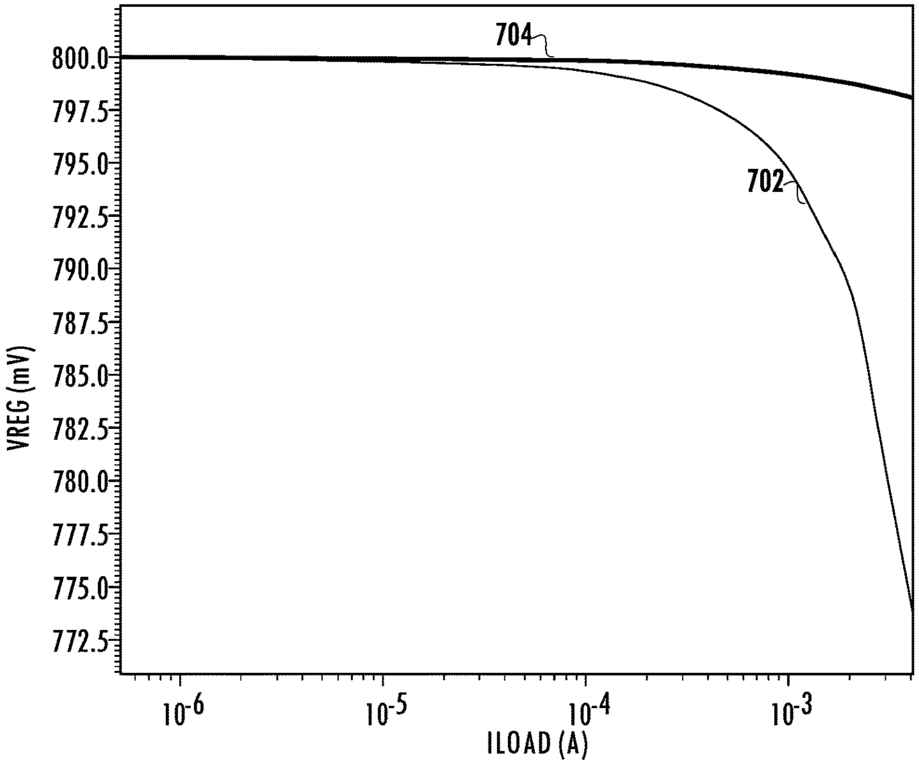
FIG. 7 illustrates regulated voltage as a function of load current for the voltage regulator circuits of FIGS. 1 and 2.
Figure 8:
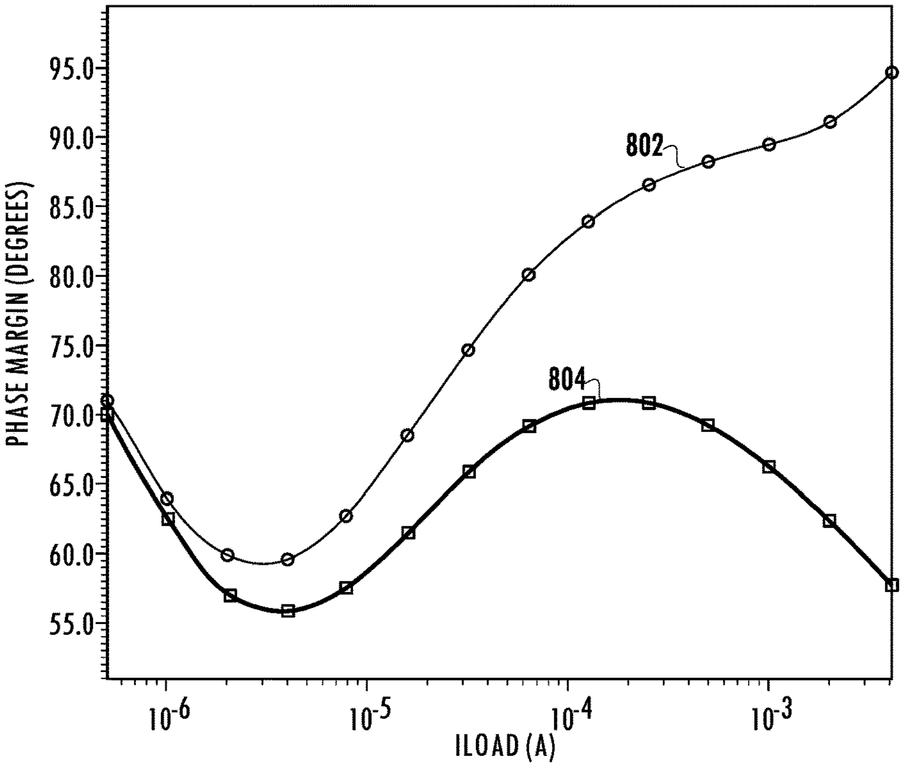
FIG. 8 illustrates phase margin as a function of load current for the voltage regulator circuits of FIGS. 1 and 2.

Referring to FIGS. 1, 2, and 7, unlike voltage regulation 702 of voltage regulator 100, which is substantially constant only at low currents (e.g., load currents of up to 10 microamperes (μA)), voltage regulation 704 of voltage regulator 200 is substantially constant for load currents across several orders of magnitude, e.g., currents from μA through milliamperes (mA). Referring to FIGS. 1, 2, and 8, phase margin 802 of voltage regulator 100 varies substantially with load current variation and varies from approximately 60 degrees to approximately 90 degrees with increases to the load current. Phase margin 804 of voltage regulator 200 has less variation with increases to load current and remains between 55 and 70 degrees of phase margin, which is an acceptable range of phase margin performance for a target application.

Figure 9:
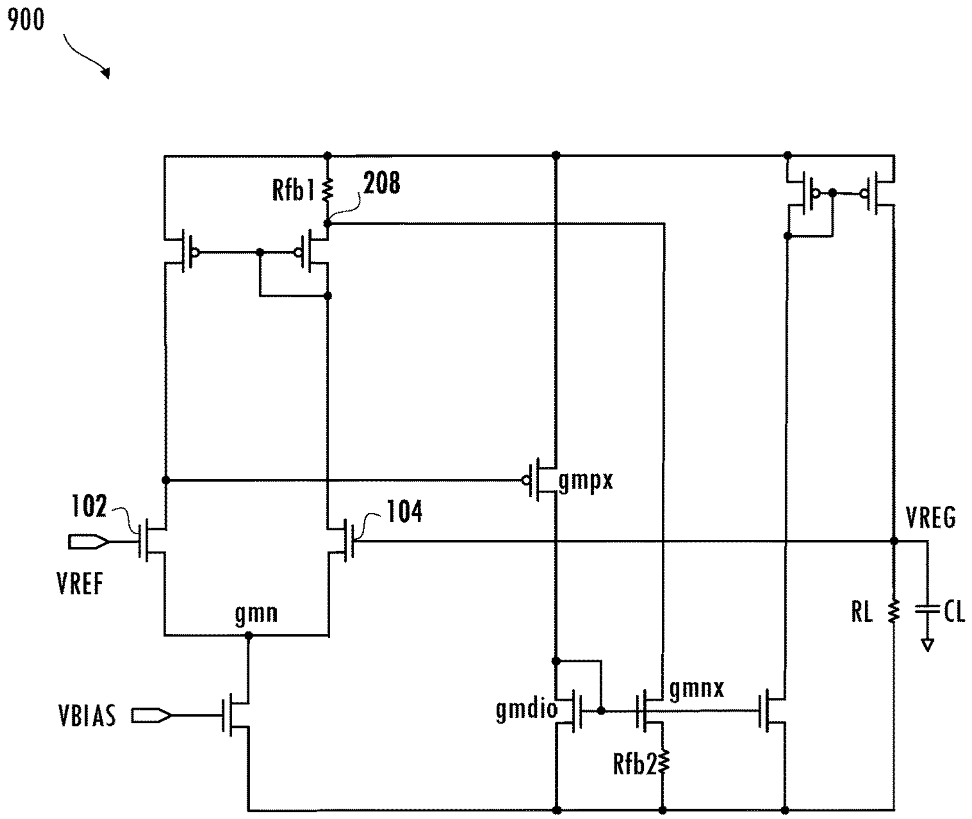
FIG. 9 illustrates a circuit diagram of a load compensating voltage regulator having a first feedback circuit and a second feedback circuit for an application having low input common mode voltages consistent with at least one embodiment of the invention.
Figure 10:
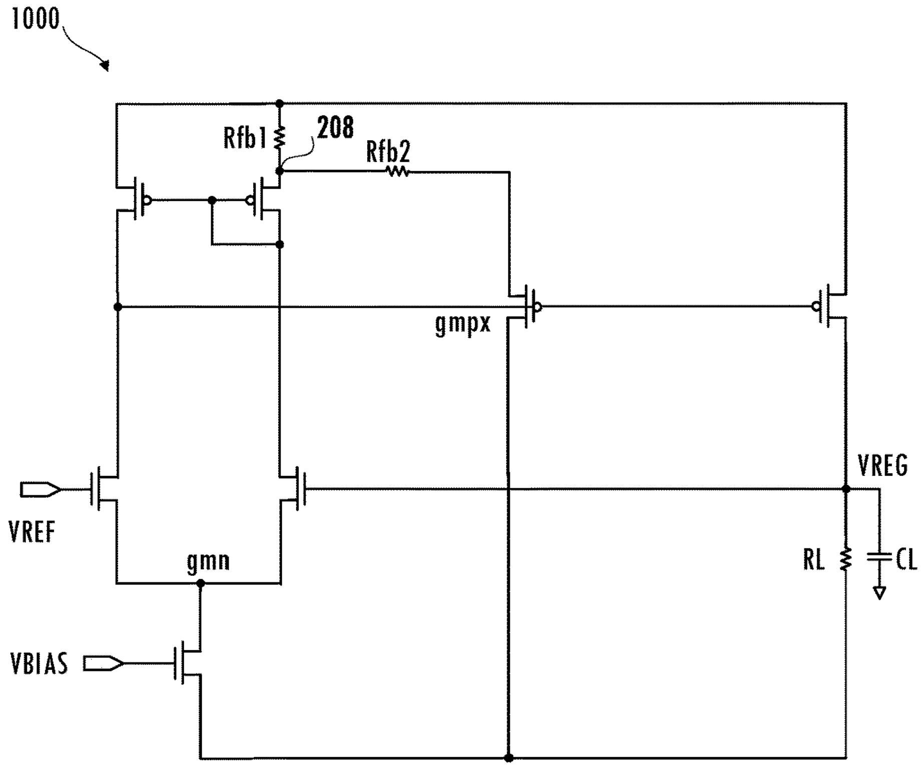
FIG. 10 illustrates circuit diagram of a load compensating voltage regulator having a first feedback circuit and a second feedback circuit for a low voltage application consistent with at least one embodiment of the invention.

Referring to FIGS. 2, 9, and 10, a second feedback path including a feedback transconductance may be implemented in other voltage regulator topologies to maintain stability and DC performance for a voltage regulator used in different applications. For example, voltage regulator 200 includes a folded cascode stage that is suited for target applications having higher input common mode voltages (e.g., common mode voltages in the range of 0.7V-0.9V for VDD as low as 1.5V). The folding about the cascode node increases the input and output voltage swing range as compared to a voltage regulator without a folded cascode stage. However, a voltage regulator using a reduced number of transistors may be used in target applications having lower input common mode voltages (e.g., input common mode voltages in a range that just maintain NMOS transistor 102 and NMOS transistor 104 in the saturation mode of operation) by excluding a folded cascode stage. For example, voltage regulator 900 does not include a folded cascode stage, has fewer transistors, and consumes less power than voltage regulator 200. Furthermore, voltage regulator 1000 implements only one amplifier for a target application that requires less gain, thereby reducing power consumption as compared to a voltage regulator including two amplifier stages. A signal indicative of the difference between reference voltage VREF and regulated voltage VREG directly controls a transistor that delivers current to the load.

Thus, voltage regulator topologies that have sufficient stability to reduce or eliminate oscillation in operation (i.e., very low transient overshoot and undershoot voltages, e.g., transient overshoot and undershoot voltages of less than 1% of output voltage) and sufficient load regulation across a wide range of load currents (i.e., load currents that may vary by multiple orders of magnitude) have been described. For example, as the load current varies from 1 μA to 3 mA, regulated voltage VREG drops by 4 mV and for regulated voltage VREG of 0.9 V, the load regulation is approximately 0.44%. The voltage regulators maintain sufficient DC loop gain and a separation over multiple orders of magnitude in frequency of the first and second poles in the open loop frequency response.

The description of the invention set forth herein is illustrative and is not intended to limit the scope of the invention as set forth in the following claims. For example, while the invention has been described in an embodiment in which the input differential pair of transistors are NMOS, one of skill in the art will appreciate that the teachings herein can be utilized with complementary transistor embodiments, e.g., embodiments of a voltage regulator using PMOS transistors as the input differential pair of transistors in a voltage regulator having a topology consistent with voltage regulators 200, 900, and 1000 of FIGS. 2, 9, and 10. The terms "first," "second," "third," and so forth, as used in the claims, unless otherwise clear by context, is to distinguish between different items in the claims and does not otherwise indicate or imply any order in time, location or quality. For example, "a first received signal," "a second received signal," does not indicate or imply that the first received signal occurs in time before the second received signal. Variations and modifications of the embodiments disclosed herein may be made based on the description set forth herein, without departing from the scope of the invention as set forth in the following claims.

What is claimed is:

1. A voltage regulator comprising:

a first circuit configured to generate a difference signal based on a reference voltage on an input node, a regulated output voltage on an output node, and a signal on a feedback node; and a second circuit configured to provide the regulated output voltage on the output node based on the difference signal, the second circuit comprising:

a first transistor coupled to receive the difference signal;

a first feedback circuit configured to provide a first feedback signal to the feedback node; and a second feedback circuit coupled to the first transistor and configured to provide a second feedback signal to the feedback node, wherein an open loop frequency response of the voltage regulator has a first pole at a first frequency and a second pole at a second frequency and the first feedback signal adjusts the second frequency of the second pole based on a load current, and wherein the second feedback signal adjusts loop gain based on the load current.

2. The voltage regulator as recited in claim 1, wherein the first frequency is several orders of magnitude less than the second frequency.

3. The voltage regulator as recited in claim 1, wherein the second circuit further comprises:

an amplifier circuit configured to generate a control signal based on the difference signal.

4. The voltage regulator as recited in claim 3, wherein the first transistor is coupled between a first power supply node and the output node.

5. The voltage regulator as recited in claim 1, wherein the first feedback circuit comprises a first resistance coupled between the feedback node and a first power supply node; and wherein the second feedback circuit comprises a feedback transconductance coupled between the feedback node and a second power supply node.

6. The voltage regulator as recited in claim 5, wherein the feedback transconductance comprises:

a p-type transistor coupled to the second power supply node and controlled by the difference signal; and a second resistance coupled between the feedback node and a source of the p-type transistor.

7. The voltage regulator as recited in claim 6, wherein the second feedback circuit further comprises:

an n-type transistor coupled between the feedback node and the second resistance.

8. The voltage regulator as recited in claim 6 wherein the second resistance is at least one order of magnitude greater than the first resistance.

9. The voltage regulator as recited in claim 5 wherein the feedback transconductance saturates at high load currents.

10. A method for generating a stable output voltage, the method comprising:

generating a regulated voltage based on a feedback signal and a difference between a reference voltage and the regulated voltage and according to an open loop frequency response having a first pole at a first frequency and a second pole at a second frequency, wherein a location of the second pole of the open loop frequency response and a DC loop gain of the generating are based on a load current.

11. The method as recited in claim 10 wherein generating the regulated voltage comprises saturating a feedback transconductance with increases to the load current.

12. The method as recited in claim 10 wherein the first frequency is several orders of magnitude less than the second frequency.

13. The method as recited in claim 10 wherein generating the regulated voltage comprises:

generating a difference signal based on the reference voltage and the regulated voltage.

14. The method as recited in claim 10 wherein generating the regulated voltage comprises:

generating the regulated voltage based on the difference;

sourcing a first current into a feedback node using a first resistance; and sinking a second current from the feedback node using a second resistance.

15. The method as recited in claim 14 wherein the second resistance is at least one order of magnitude greater than the first resistance.

16. The method as recited in claim 10 wherein generating the regulated voltage further comprises:

amplifying the difference to generate a control signal; and wherein the regulated voltage is generated using the control signal.

17. An apparatus comprising:

means for generating a regulated voltage based on a difference between a reference voltage and the regulated voltage according to an open loop frequency response having a first pole at a first frequency and a second pole at a second frequency;

means for adjusting the second frequency of the second pole based on a load current; and means for compensating for a reduction in DC loop gain caused by adjusting the second frequency of the second pole.

18. The voltage regulator as recited in claim 5 wherein the feedback transconductance saturates with increases to the load current.

19. The voltage regulator as recited in claim 5 wherein the first resistance and the feedback transconductance are directly coupled to the feedback node.

* * * * *